Patented Aug. 14, 1945

2,382,581

UNITED STATES PATENT OFFICE 2,382,581

SILICA CHROMIUM OXIDE CATALYTIC MATERIALS

Robert F. Ruthruff, Chicago, Ill., assignor to Process Management Company, Inc., New York, N. Y., a corporation of Delaware No Drawing. Application May 28, 1940, Serial No. 337,627

3 Claims. (Cl. 252—250)

This invention relates to catalysts containing silica and chromium oxide, and is particularly concerned with a method of preparing such catalysts whereby the components are brought together free from deleterious foreign substances and in a state of aggregation which is favorable to the manifestation of their catalytic properties. The invention also relates to the employment of such catalytic substances in hydrocarbon conversions of the dehydrogenating or aromatizing type.

So far as is known silica alone is without effect as a dehydrogenation catalyst and silica co-precipitated or impregnated with chromium oxide by known methods is likewise either inactive or very slightly active. The successful method comprising the present invention differs from prior methods most obviously in that ethyl ortho-silicate is used to produce silica in the "gel" form, the interstitial pore surface of which is so desirable for catalytic purposes providing it can be obtained free of deleterious substances.

Ethyl ortho-silicate is miscible with alcohol but almost immiscible with water. It is miscible with alcohol containing a small amount of water, however, and in the presence of this water undergoes a slow hydrolysis reaction as a result of which it becomes miscible with larger amounts of water. When additional water is then added the hydrolysis soon goes to completion with the formation of a gel silica and ethyl alcohol. It will be seen that this is a method of obtaining gel silica completely free of adsorbed ions such as sodium and chloride ions. These and other ions have been shown to inhibit catalytic activity, and when silica gel is prepared by conventional methods involving the neutralization of water glass with an acid, it is doubtful whether all ions are completely removed even by prolonged washing. Thus it may be postulated that the superiority of the silica-chromium oxide catalysts prepared by my method is due to the complete absence of foreign ions. Other explanations are possible, however, and it is to be understood that my invention is not limited by any theory advanced to account for its utility. The data hereinafter given establish the efficacy of my method beyond peradventure.

In accordance with the method of my invention, ethyl ortho-silicate is caused to hydrolyze by the previously described procedure in the presence of hydrous chromium sesquioxide ($Cr_2O_3$) which has been well washed to remove foreign ions, or in the presence of chromium trioxide (which yields the sesquioxide upon strong heating or reduction) which has been dissolved in the water causing the hydrolysis. When the sesquioxide is used directly, I allow an ethyl ortho-silicate solution to hydrolyze and precipitate silica thereon and therein, removing the residual liquid by decantation. In the case of the ethyl ortho-silicate-chromium trioxide solution hydrolysis, I evaporate the solution as hydrolysis is taking place so that the chromium trioxide will be left on and in the precipitated silica.

These two variations differ in the order in which the two components are formed. In the first or sesquioxide variation, the chromium is precipitated first and the hydrolyzed silica deposited on and in it. In the second or trioxide variation the hydrolysis takes place first with the deposition of chromium trioxide ($CrO_3$) in and on the silica, and with the subsequent conversion of the former into sesquioxide. Both variations give an active catalyst, the first being preferred.

Two examples will now be given to illustrate how the catalyst may be prepared. In the first example, corresponding to the first variation mentioned in the previous paragraph, hydrous chromium sesquioxide was prepared as follows:

*Example I*

A 0.2 normal solution (based on the nitrate radical) of chromium nitrate was made up by dissolving 152.4 grams of the nonahydrate

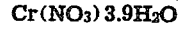

$$Cr(NO_3)_3.9H_2O$$

in 6 liters of water. An ammonia solution of the same normality was prepared by diluting 77 cc. of concentrated (29%) ammonium hydroxide with 6 liters of water. The chromium nitrate solution was rapidly stirred and the ammonia solution was added dropwise at a rate of 6 cc. per minute until 3 liters had been added. The mixture was then stirred for four hours and the addition of ammonia solution resumed at the same rate as before. As soon as a permanent precipitate was formed the remainder of the ammonia solution was added rapidly. (Due to variations in the water content of chromium nitrate nonahydrate, more or less than the theoretical amount of alkali may be required for complete precipitation. The amount of alkali specified in this example was based on the actual composition of the nonahydrate sample used.) The gelatinous precipitate was allowed to settle and the supernatant liquid was removed as completely as possible, following which sufficient distilled water was added to bring the volume up to its original mark. The suspension was stirred for a half hour, allowed to settle, and the supernatant liquid again removed. This method of washing was repeated six times, leaving the precipitate as a sludge after decantation of the last wash water. It will be observed that this method involves only the ammonium and nitrate ions, both of which are destroyed by heating.

To 300 cc. of ethyl ortho-silicate was added 175 cc. of ethyl alcohol and 5.6 cc. of water. The mixture was allowed to stand for 24 hours to allow hydrolysis to begin and was then diluted with sufficient water to equal the volume of the last wash water removed from the chromium precipitate. The diluted silicate mixture was added to the chromium precipitate and stirred for four hours. After standing overnight to permit complete hydrolysis and precipitation of silica on and in the chromium sesquioxide, the supernatant liquid was drawn off and the catalyst filtered and dried.

25 grams of the catalyst prepared as above was placed in a tube. Normal heptane was then vaporized at the rate of 18 cc. per hour and passed through the tube, the catalyst and heptane vapors being contacted at a temperature of 890° F. The conversion products were cooled to room temperature and separated into a liquid and a gas. In five hours the gas production amounted to a total of 15,350 ccs. of which more than 85% was hydrogen, while the liquid product was found to contain about 12% toluene. In a subsequent run using 10 cc. of catalyst, butane was converted at the rate of 8 liters per hour and at a temperature of 890° F. The $C_4$ fraction of the product was found to contain about 11% olefins.

*Example II*

The second example to be given corresponds to the second or chromium trioxide variation previously mentioned. 300 cc. of ethyl ortho-silicate was mixed with 175 cc. of ethyl alcohol and 5.6 cc. of water and allowed to stand twenty-four hours as before. To the mixture was then added 51 cc. of water in which had been dissolved 12.4 grams of chromium trioxide. As hydrolysis of the ethyl ortho-silicate took place the solution was allowed to evaporate slowly to dryness and finally the silica impregnated with $CrO_3$ was placed in a muffle furnace and heated to 1200° F. for one hour to convert the $CrO_3$ into $Cr_2O_3$. Treatment with a reducing agent such as alcohol may be substituted for the heating step if desired; for example, by boiling in dilute alcohol under a reflux condenser.

Twenty-five grams of the catalyst prepared as above was used to convert an East Texas heavy naphtha which was vaporized at the rate of 25 cc. per hour and contacted with it at 932° F. The conversion products were separated as in the previous runs and the gas evolved in five hours, consisting of about 83% hydrogen, amounted to 7000 ccs.

By varying the proportions of the reagents from those taken in the examples, I may obtain catalysts in which the ratio of chromium oxide to silica is any value desired, but in general the range of from 5 to 20% $Cr_2O_3$ in the final product is preferred. As shown by the examples, the catalysts prepared in accordance with my method are suitable for the conversion of hexanes and heptanes into the corresponding cyclic compounds and for the dehydrogenation of lower molecular weight hydrocarbons into olefins. They are especially satisfactory for preparing a high octane motor fuel from naphtha of low octane. In order to illustrate the unsuitability of chromium oxide-silica catalysts prepared by conventional methods for the aforementioned purposes, two additional examples will now be given.

*Example III*

100 grams of ordinary commercial grade silica gel purchased on the open market was added to 1000 ccs. of water in which 20 grams of chromium trioxide had been dissolved. The solution was digested on a steam bath for two hours and the supernatant liquid then decanted. The silica was colored orange, indicating that impregnation had taken place. It was washed by decantation to remove superficial traces of the impregnating solution and was then placed in 1000 ccs. of water to which 80 ccs. of ethyl alcohol had been added. The mixture was boiled under reflux with stirring for 16 hours, during which time the silica assumed a green color indicating that the chromium trioxide had been reduced by the alcohol to chromium sesquioxide. The liquid was then decanted from the silica and after washing by decantation the silica was dried and tested for catalytic activity in the same manner as the catalyst prepared as described in Example 1. The catalyst prepared from commercial silica gel was found to be substantially without activity, as only 120 ccs. of gas was produced in 30 minutes of contact with heptane vapors at 932° F. The heptane was vaporized and passed over the catalyst at the rate of 25 ccs. (liquid volume) per hour, and 25 grams of catalyst was used in the test.

*Example IV*

A chromium trioxide solution was made up by dissolving 45.7 grams in 250 ccs. of water. A sodium silicate solution was made up by dissolving 200 ccs. of a commercial grade known as "N Brand" in 800 ccs. of water. 200 ccs. of the chromium trioxide solution was then added to 500 ccs. of the sodium silicate solution while stirring the latter violently. A dark reddish gel was soon formed. After the usual washing and drying operations this material was heated to 1200° F. for one hour and then leached with water to remove $Na_2O$ released as a product of the decomposition of sodium dichromate into chromium sesquioxide. After redrying the material it was tested for catalytic activity by contacting it with vapors of an East Texas heavy naphtha exactly as in Example II. A very slight effect on the naphtha was observed, only 200 ccs. of gas being evolved in the first 30 minutes of operation.

Although the conditions of operation mentioned in the examples are suitable for determination of catalyst activity, in commercial operation I prefer to proceed differently. As already emphasized, the catalysts of my invention are of utility in the dehydro-aromatization of low octane naphthas for the production of high octane motor fuels. The process by which I bring this about is preferably operated at pressures between atmospheric and 500 pounds per square inch. I prefer to contact the naphtha vapors with the catalyst at temperatures of about 900° to 1100° F. for times corresponding to space velocities of about 0.1 to 10 liquid volumes of naphtha per volume of catalyst per hour. I also prefer to recycle up to 9 mols of the by-product hydrogen per mol of naphtha being converted, as this tends to retard the deposition of carbon on the catalyst.

The catalysts prepared in accordance with my invention are susceptible of repeated regeneration by the usual combustion methods when their activity has been impaired by the accumulation of a deposit of carbon.

My invention is not limited by the examples which have been given but only by and in the following claims in which I wish to claim all novel features residing therein.

I claim:

1. A method of preparing a silica-chromium oxide catalyst suitable for the dehydrogenation of hydrocarbons which comprises hydrolyzing ethyl ortho-silicate with a water solution of chromium trioxide so as to produce on drying in the presence of said solution silica impregnated with chromium trioxide and converting the chromium trioxide into chromium sesquioxide.

2. A method as in claim 1 wherein the conversion of chromium trioxide into chromium sesquioxide is effected by heating to an elevated temperature.

3. A method as in claim 1 wherein the conversion of chromium trioxide into chromium sesquioxide is effected by reduction with alcohol.

ROBERT F. RUTHRUFF.